United States Patent
Liu et al.

(10) Patent No.: US 10,416,914 B2
(45) Date of Patent: Sep. 17, 2019

(54) METHOD AND APPARATUS FOR PATH SELECTION OF STORAGE SYSTEMS

(71) Applicant: EMC IP HOLDING COMPANY LLC, Hopkinton, MA (US)

(72) Inventors: Bing Liu, Tianjin (CN); Man Lv, Beijing (CN); James Lei Ni, Beijing (CN); Martin Chaojun Mei, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 73 days.

(21) Appl. No.: 15/381,428

(22) Filed: Dec. 16, 2016

(65) Prior Publication Data

US 2017/0177264 A1    Jun. 22, 2017

(30) Foreign Application Priority Data

Dec. 22, 2015  (CN) .......................... 2015 1 0975001

(51) Int. Cl.
*G06F 3/00*  (2006.01)
*G06F 3/06*  (2006.01)

(52) U.S. Cl.
CPC .......... *G06F 3/0635* (2013.01); *G06F 3/0613* (2013.01); *G06F 3/0653* (2013.01); *G06F 3/0689* (2013.01)

(58) Field of Classification Search
CPC .... G06F 3/0635; G06F 3/0689; G06F 3/0613; G06F 3/0653
See application file for complete search history.

(56) References Cited

U.S. PATENT DOCUMENTS

| | | | |
|---|---|---|---|
| 7,275,103 B1 * | 9/2007 | Thrasher ................. | H04L 45/22 709/223 |
| 7,760,626 B2 * | 7/2010 | Malpani ................ | H04L 67/101 370/230 |
| 9,465,550 B1 * | 10/2016 | Lippitt .................. | G06F 3/0613 |
| 9,647,905 B1 * | 5/2017 | Pittman ................... | H04L 43/00 |

(Continued)

OTHER PUBLICATIONS

"iSCSI Host Bus Adapter for IBM BladeCenter,System x, or xSeries" IBM, Sep. 2007 (Year: 2007).*

(Continued)

*Primary Examiner* — Francisco A Grullon
(74) *Attorney, Agent, or Firm* — Brian J. Colandreo; Mark H. Whittenberger; Holland & Knight LLP (57) ABSTRACT

Embodiments of the present disclosure provide methods and apparatus for path selection in a storage system. The storage system includes a plurality of storage devices, each storage device being connected to a plurality of different HBA ports of a server via a plurality of paths; the method comprises: monitoring a system-wide performance metric of the storage system to obtain dynamic performance statistics; detecting a performance-related event based on the dynamic performance statistics; and selecting, from the plurality of paths, an active path for a storage device of the plurality of storage devices based on the dynamic performance statistics and a result of the detecting. With the methods or apparatus according to the embodiments of the present disclosure, performance bottleneck can be avoided or timely eliminated, load balance can be achieved, and system resources can be utilized more effectively.

18 Claims, 5 Drawing Sheets

(56) References Cited

U.S. PATENT DOCUMENTS

| | | | | |
|---|---|---|---|---|
| 2004/0243699 A1* | 12/2004 | Koclanes | ................ | H04L 29/06 709/224 |
| 2005/0259632 A1 | 11/2005 | Malpani et al. | | |
| 2006/0020691 A1* | 1/2006 | Patterson | ................ | G06F 3/061 709/223 |
| 2006/0271677 A1* | 11/2006 | Mercier | .............. | G06F 16/1824 709/224 |
| 2008/0141264 A1* | 6/2008 | Johnson | ................ | G06F 9/455 718/105 |
| 2008/0250178 A1* | 10/2008 | Haustein | ................ | H04L 47/10 710/107 |
| 2009/0172666 A1* | 7/2009 | Yahalom | .............. | G06F 3/0605 718/1 |
| 2010/0161838 A1* | 6/2010 | Daniel | ................ | G06F 13/385 710/8 |

OTHER PUBLICATIONS

First Chinese Office Action issued in CN Application No.; 2015109750012 dated Jun. 24, 2019.

\* cited by examiner

METHOD AND APPARATUS FOR PATH SELECTION OF STORAGE SYSTEMS

RELATED APPLICATIONS

This application claim priority from Chinese Patent Application Number CN201510975001.2, filed on Dec. 22, 2015 at the State Intellectual Property Office, China, titled "METHOD AND APPARATUS FOR PATH SELECTION OF STORAGE SYSTEMS," the contents of which is herein incorporated by reference in its entirety

FIELD

Embodiments of the present disclosure relate to a storage system, and more specifically, to methods and apparatus for path selection in a storage system.

BACKGROUND

Figure 1:
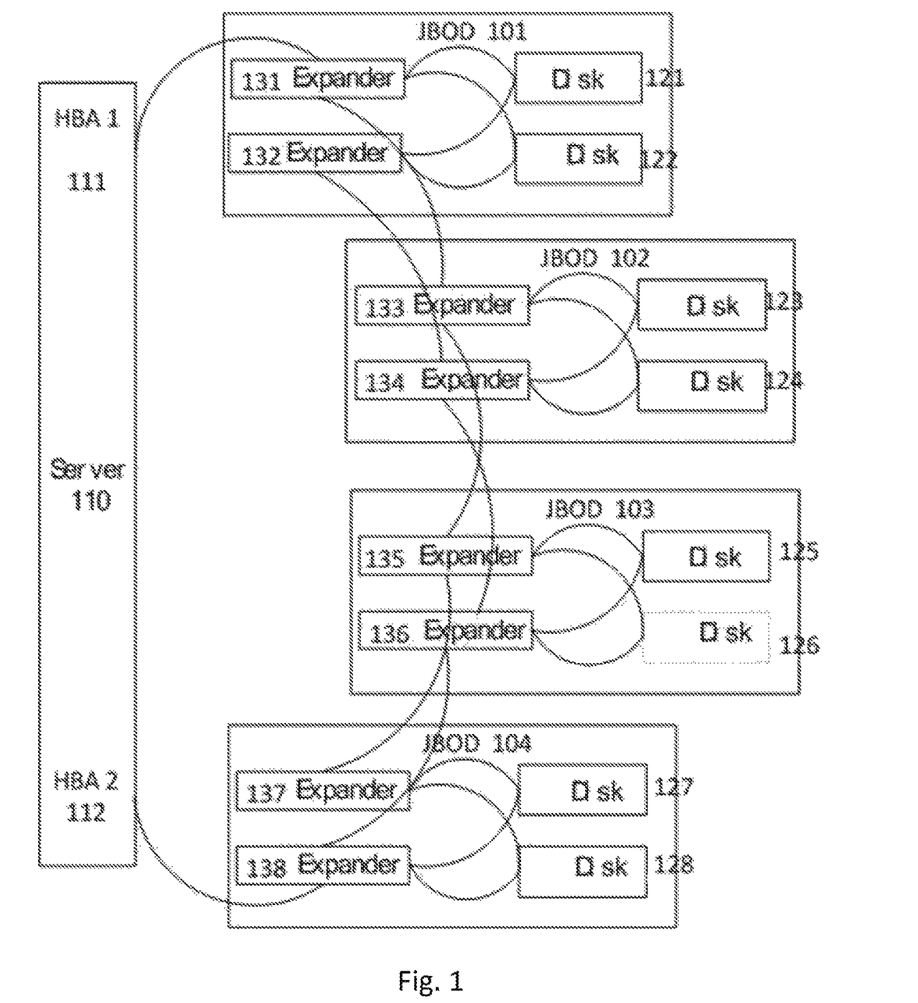
FIG. 1 shows a diagram of a dual-SAS domain topology.

In an enterprise storage solution, a multipath technology has been widely used in a serially-attached small computer system interface (SAS) domain to provide path redundancy, fault toleration, and load balance. As shown in FIG. 1, in a common use case in a backend storage application, a plurality of disk clusters (JBODs, Just A Bunch of Disks) (101-104) are provided, wherein disk drivers (121-128) in each JBOD are routed to different host bus adapter (HBAs) ports (111, 112) via one or more expanders (131-138), such that two paths to the server (110) exist. The multipath technology is used for path switching between two HBA ports for a given disk driver.

In the field of load balance, multipath plays an important role, and is very critical for the whole system performance. For example, in FIG. 1, a multipath module is needed to balance workloads between two paths of a disk driver. Some reasons are detailed below.

One chain in the SAS domain as shown in FIG. 1 may have a very large capacity of storage devices, which causes bandwidth saturation of a single HBA port. For example, for a Data Domain™ (DD) product, at most 7 disk enclosures can be connected in a chain. Each disk enclosure may include 15 disks and provide an input output (IO) throughput of 800 MB per second. This means that, in the worst case, a busy HBA with a 2 GB/s bandwidth can easily become a bottleneck of the whole system, even if another HBA still has enough bandwidth available at the same time.

In particular, the situation will become even worse if a solid-state disk (SSD) enclosure is introduced into a chain. First, the SSD disk enclosure produces more throughput, which will accelerate saturation of the bandwidth. Second, due to different characteristics from a hard disk driver (HDD) disk medium, the SSD will consume much more bandwidth, such that without an effective congestion control policy in SAS protocol, starvation may occur to an HDD enclosure located at the same chain with the SSD.

In the embodiments of the present disclosure, methods and apparatus for providing effective path selection and load balance in a storage system are provided.

SUMMARY

Embodiments of the present disclosure provide methods and apparatus for path selection in a storage system. Hereinafter, a brief summary of various embodiments will be given to provide basic understanding of some aspects of the various embodiments. The summary is not intended to identify gist of key elements or describe scope of various embodiments. The only objective lies in presenting some concepts in a simplified manner as a prelude for more specific depiction hereinafter.

A first aspect of the present disclosure provides a method for a storage system, the storage system includes a plurality of storage devices and each storage device is connected to a plurality of different HBA ports of a server via a plurality of paths, the method comprises: monitoring a system-wide performance metric of the storage system to obtain dynamic performance statistics; detecting a performance-related event based on the dynamic performance statistics; and selecting, from the plurality of paths, an active path for a storage device of the plurality of storage devices based on the dynamic performance statistics and a result of the detecting.

In one embodiment, monitoring a system-wide performance metric of the storage system may include: monitoring performance metrics at the plurality of different HBA ports. In another embodiment, the performance metrics at the plurality of different HBA ports include at least one of: throughput, delay, and resource utilization. In a further embodiment, monitoring a system-wide performance metric of the storage system may further include monitoring at least one of local performance metrics of the plurality of storage devices and local performance metrics of the plurality of paths.

In one embodiment, the performance-related event may include at least one of the following: a performance bottleneck at a HBA port of the plurality of different HBA ports; imbalance of performance of the plurality of HBA ports; and performance of a storage device of the plurality of storage devices being lower than a threshold.

In another embodiment, the selecting, from the plurality of paths, an active path for a storage device of the plurality of storage devices based on the dynamic performance statistics and a result of the detecting may include: dividing the plurality of storage devices into a plurality of subsets respectively corresponding to the plurality of different HBA ports based on the dynamic performance statistics and the result of detecting, and routing storage devices in the each of the plurality of subsets to their corresponding HBA ports.

In still another embodiment, the selecting, from the plurality of paths, an active path for a storage device of the plurality of storage devices, based on the dynamic performance statistics and a result of the detecting may include: in response to detecting a performance bottleneck or a heavy workload at a first HBA port of the plurality of different HBA ports, performing dynamic path selection for a storage device in the plurality of storage devices, so as to re-route at least part of workload of the first HBA port to another HBA port of the plurality of HBA ports. In one embodiment, performing dynamic path selection for a storage device of the plurality of storage devices so as to re-route at least part of workload of the first HBA port to another HBA port of the plurality of HBA ports may include: computing an expected workload required to be offloaded from the first HBA port; selecting a group of storage devices from the plurality of storage devices based on the computing, and switching an active path for the group of storage devices to a path through another HBA port other than the first HBA port. In another embodiment, computing an expected workload required to be offloaded from the first HBA port may include: computing the expected workload required to be offloaded at least based on a performance metric of the first HBA port and a predetermined threshold. In a further embodiment, selecting a group of storage devices from the plurality of storage devices based on the computing may include: selecting a group of storage devices from the plurality of storage devices, such that a sum of current performance metrics of the group of storage devices matches the computed expected workload. In a further embodiment, selecting a group of storage devices from the plurality of storage devices based on the computing may include: selecting a plurality of groups of storage devices from the plurality of storage devices, such that a sum of current performance metrics of each group of storage devices in the plurality of groups of storage devices matches the expected workload as computed; and selecting a group of storage devices from the plurality of groups of storage devices based on a predetermined criterion. In a further embodiment, selecting a group of storage devices from the plurality of groups of storage devices based on a predetermined criterion includes: selecting a group of storage devices with a maximum sum of priority weights from the plurality of groups of storage devices.

In one embodiment, the method may include: monitoring topology update of the storage system; and selecting, from the plurality of paths, an active path for a storage device of the plurality of storage devices, based on a result of the detecting and the dynamic performance statistics may include: selecting an active path for the storage device of the plurality of storage devices according to a first path selection policy in response to detecting a topology update event without detecting a performance related event; and selecting an active path for a storage device of the plurality of storage devices according to a second path selection policy in response to detecting a performance related event. In another embodiment, the first path selection policy is a default static path selection policy, and/or, the second path selection policy is a dynamic path selection policy. In a further embodiment, selecting an active path for a storage device of the plurality of storage devices according to a first path selection policy in response to detecting a topology update event without detecting a performance related event may include: verifying validity of an updated topology in response to detecting the topology update event without detecting the performance related event, and selecting an active path for a storage device of the plurality of storage devices according to the first path selection policy in response to detecting that the updated topology is valid.

In another embodiment, the selecting, from the plurality of paths, an active path for a storage device of the plurality of storage devices based on the dynamic performance statistics and a result of the detecting may include: selecting, from among the plurality of paths, an active path for a storage device of the plurality of storage devices based on the result of the detecting, the dynamic performance statistics, and a priority of the paths.

In one embodiment, the method may further include: updating at least one of a path status and a path priority based on a result of the selecting.

In a further embodiment, the method may further include: performing the monitoring, detecting, and selecting iteratively untill a desired performance objective is achieved.

A second aspect of the present disclosure provides an apparatus for a storage system, the storage system includes a plurality of storage devices, and each of the plurality of storage devices is connected to a plurality of different HBA ports of a server via a plurality of paths, the apparatus comprises: a performance monitor, configured to monitor a system-wide performance metric of the storage system to obtain dynamic performance statistics; an event detector, configured to detect a performance-related event based on the dynamic performance statistics; and a path selector, configured to select, from the plurality of paths, an active path for a storage device of the plurality of storage devices based on the dynamic performance statistics and a result of the detecting.

In one embodiment, the performance monitor may include: an HBA port performance monitor, configured to monitor a system-wide performance metric of the storage system by monitoring performance metrics at the plurality of different HBA ports. In another embodiment, the performance metrics at the plurality of different HBA ports include at least one of: throughput, delay, and resource utilization. In a further embodiment, the performance monitor may further include a local performance monitor configured to monitor at least one of local performance metrics of the plurality of storage devices, and local performance metrics of the plurality of paths.

In one embodiment, the performance-related event may include at least one of the following: performance bottleneck at a HBA port of the plurality of different HBA ports; imbalance of performance of the plurality of HBA ports; and performance of a storage device of the plurality of storage devices being lower than a threshold.

In another embodiment, the path selector may be configured to select, from the plurality of paths, an active path for a storage device of the plurality of storage devices by: dividing the plurality of storage devices into a plurality of subsets respectively corresponding to the plurality of different HBA ports based on a result of detecting and the dynamic performance statistics, and routing storage devices in each of the plurality of subsets to their corresponding HBA ports.

In one embodiment, the path selector may further include: a load balancer, configured to re-route at least part of workload at a first HBA port to another HBA port of the plurality of HBA ports, in response to detecting a performance bottleneck or a heavy workload at the first HBA port of the plurality of different HBA ports. In another embodiment, the load balancer may further include: an offloaded workload computing device, configured to compute an expected workload required to be offloaded from the first HBA port in response to detecting a performance bottleneck or a heavy workload at the first HBA port of the plurality of different HBA ports; a storage device selector, configured to select a group of storage devices from the plurality of storage devices based on the computing, and a path switching device, configured to switch the active path for the group of storage devices to a path of another HBA port other than the first HBA port. In a further embodiment, the offloaded workload computing device may be further configured to: compute the expected workload required to be offloaded at least based on a performance metric of the first HBA port and a predetermined threshold. In a further embodiment, the storage device selector may be further configured to: select a group of storage devices from the plurality of storage devices based on the computing, such that a sum of current performance metrics of the group of storage devices matches the computed expected workload. In one embodiment, the storage device selector may be further configured to: select a plurality of groups of storage devices from the plurality of storage devices, such that a sum of current performance metrics of each group of storage devices in the plurality of groups of storage devices matches the expected workload as computed; and select a group of storage devices from the plurality of groups of storage devices based on a predetermined criterion. In a further embodiment, selecting a group of storage devices from the plurality of groups of storage devices based on a predetermined criterion includes: selecting a group of storage devices with a maximum sum of priority weights from the plurality of groups of storage devices.

In one embodiment, the apparatus may further include: a topology monitor, configured to monitor topology update of the storage system; and the path selector may further include a decision module configured to select an active path for a storage device of the plurality of storage devices according to a first path selection policy in response to detecting a topology update event without detecting a performance related event; and select an active path for a storage device of the plurality of storage devices according to a second path selection policy in response to detecting a performance related event. In another embodiment, the first path selection policy may be a default static path selection policy, and/or, the second path selection policy may be a dynamic path selection policy. In a further embodiment, the apparatus may further comprise a topology verifier configured to verify validity of an updated topology in response to detecting the topology update event, and the decision module may be further configured to select an active path for a storage device of the plurality of storage devices according to a first path selection policy in response to detecting that the updated topology is valid but the performance related event is not detected.

In one embodiment, the path selector may be further configured to: select, from the plurality of paths, an active path for a storage device of the plurality of storage devices based on a result of the detecting, the dynamic performance statistics, and a priority of the paths.

In another embodiment, the apparatus may further comprise: a multipath module configured to update a path status and/or a path priority based on a result of the selecting.

In a further embodiment, the apparatus may further include a performance tuner configured to cause the performance monitor, the event detector, and the path selector to perform the monitoring, detecting, and selecting operations iteratively, till a desired performance objective is achieved.

A third aspect of the present disclosure provided a device, the device comprises at least one processor; and at least one memory including computer program code, wherein the at least one memory and the computer program code are configured to: with the at least one processor, cause the apparatus to perform a method according to the first aspect of the present disclosure.

With the method or apparatus according to the embodiments of the present disclosure, the performance bottleneck can be avoided or eliminated timely, load balance can be achieved, and system resources can be utilized more effectively.

Although particular embodiments are illustrated by way of example in the accompanying drawings, it should be understood that depiction of the particular embodiments herein are not intended to limit the embodiments to the exact form as disclosed.

BRIEF DESCRIPTION OF THE DRAWINGS

In the disclosure and claims hereinafter, the objectives, advantages, and other features of the present disclosure will become more apparent. Here, only for the purpose of illustration, non-limiting depiction of particular embodiments will be described with reference to the accompanying drawings, in which:

DETAILED DESCRIPTION

In the depiction below, many details are provided for the purpose of illustration. However, those with ordinary skills in the art will recognize that embodiments of the present disclosure may be implemented without these specific details. Therefore, the present disclosure is not limited to the illustrated embodiments, but will be assigned with the broadest scope consistent with the principle and feature described in the present disclosure.

It should be understood that terms "first" and "second" and the like are only used for distinguishing one element from another. Actually, a first element can also be referred to as a second element; vice versa. In addition, it should also be understood that "comprise," "comprising," "include" and "including" are only used for indicating existence of the stated features, elements, functions or components, but do not exclude existence of one or more other features, elements, functions or components.

As mentioned above, a multipath technology may be required in the storage system to achieve load balance. Regarding the problems of load imbalance and performance bottleneck, existing multipath schemes attempt to propose different solutions. However, for various different reasons, these existing solutions cannot work well. These solutions comprise:

1. Static Path Selection Configuration

This solution allows configuring an active path for each disk manually. The method does not take dynamic performance change into consideration but performs path selection completely dependent on an engineer's experience.

2. Hops-Based Path Selection

This solution assumes that a count of hops from a disk to an HBA port is closely associated with time delay and performance of the disk. This method works well in many circumstances. However, a smaller count of hops is not necessarily equivalent to a higher performance. Performance problem has been found for some specific types of disk enclosures of the DD system. In addition, the method is likewise a static path selection, thereby lacking flexibility and scalability.

3. Path Selector of DM-Multipath Implementation

This solution is used by an open source device mapper multipath target. For example, in Linux 3.2, there are three kinds of path selectors: round-robin, queue-length, and service-time. Different from the first two solutions, these path selectors (particularly the latter two thereof) have a capability of efficiently handling dynamic performance change using path metrics. However, they still have their own defects.

For example, these solutions determine a path selection only based on local metrics collected by tracing a batch of IOs of certain disks. Therefore, system-wide knowledge, such as information about whether an HBA port is heavily busy at given time, is un available.

These types of selectors work only in a fine-grained way, which requires to switch paths frequently. However, such frequent path switching may cause performance degradation on Serial Advanced Technology Attachment (SATA) disks, since different from SAS disks, the SATA drivers were not initially designed to support multiple initiators (e.g., multiple HBAs 111 and 112 in FIG. 1) concurrently. Although dual-port can be simulated by adding an interface converter, its performance is not as good as in a single-port connection scenario when switching between different paths, because its internal design is not optimized for path switching.

In order to solve at least some of the problems above, embodiments of the present disclosure provide methods and apparatus for path selection in a storage system.

Figure 2A:
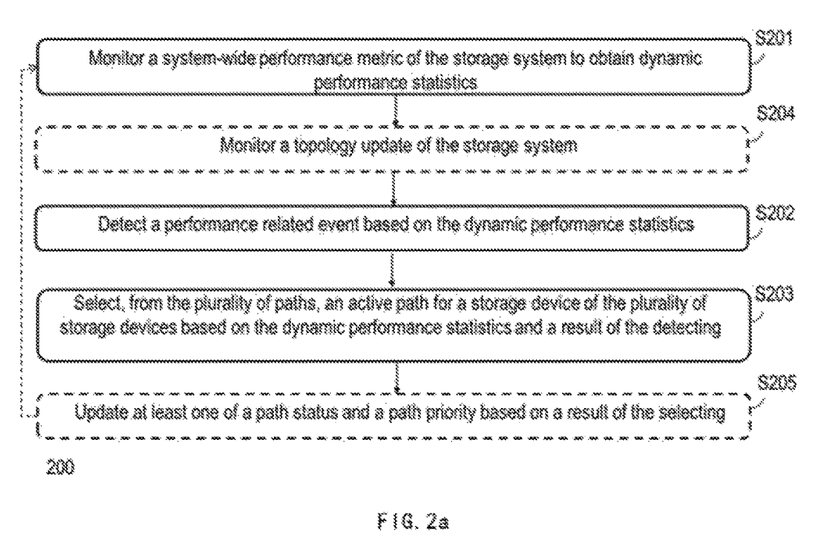
FIGS. 2a-b show a flow diagram of a method according to the embodiments of the present disclosure.

FIG. 2a shows an example flow diagram of a method 200. A storage system to which the method is applied includes a plurality of storage devices, each storage device being connected to a plurality of different HBA ports of a server via a plurality of paths. For example, the storage system may have a structure as shown in FIG. 1, and the storage devices may be disks (121-128) as shown in FIG. 1. However, as can be understood by those skilled in the art, the method may also be applied to other storage systems.

As shown in FIG. 2a, the method 200 comprises: at block S201, monitoring a system-wide performance metric of the storage system to obtain dynamic performance statistics; at block S202, detecting a performance-related event based on the dynamic performance statistics; and at block S203, selecting, from the plurality of paths, an active path for a storage device of the plurality of storage devices based on the dynamic performance statistics and a result of the detecting.

With this method, path selection can be performed using a system-wide performance metric, so as to avoid or timely detect a performance bottleneck and handle it; in addition, the method can effectively adapt to dynamic change of performance so as to enable more efficient utilization of system resources.

In some embodiments, at block S201, the system-wide performance metric of the storage system may be monitored by monitoring performance metrics at a plurality of different ports. The ports may be, but not limited to, HBA ports (e.g., HBAs 111, 112 in FIG. 1). As can be understood by those skilled in the art, dependent on different storage structures and technologies, and with development of the technologies, the HBA ports may also be replaced by other ports. Therefore, embodiments of the present disclosure are not limited to the HBA ports. In another embodiment, the performance metrics at an HBA port may include, but not limited, at least one of: throughput, delay, and resource utilization. In another embodiment, at block S201, at least one of the following may also be monitored: a local performance metric of the plurality of storage devices; and a local performance metric of a plurality of paths. In the embodiment, path selection can be performed by concurrently utilizing dynamic statistics of the system-wide performance metrics and local metrics of a specific storage device and/or a path.

In one embodiment, at block S202, the performance-related events detected based on the dynamic performance statistics may include, but not limited to, performance bottleneck at a HBA port (e.g., HBA 1, 111 in FIG. 1) in a plurality of different HBA ports, and/or performance imbalance of a plurality of different HBA ports, and/or the performance of a storage device of the plurality of storage devices being lower than a threshold. These events may trigger a dynamic path selection.

In one embodiment, based on a result of detecting at block S202 and the dynamic performance statistics obtained at block S201, at block S203, a plurality of storage devices may be divided into a plurality of subsets corresponding to the plurality of different HBA ports, respectively, and the storage devices in each of the subset are routed to their corresponding HBA ports. Specific partition of the subsets may be determined based on the result of detecting and the dynamic performance statistics obtained at block S201. For example, an HBA port which is shown to be high load by the statistics, may be made to correspond to a subset of storage devices with a lower load. This enables to balance workloads of respective HBA ports, avoid or solve load imbalance.

In another embodiment, at block S203, if a performance bottleneck or a too heavy workload is detected at a first HBA port in a plurality of different HBA ports, dynamic path selection may be performed for a storage device of the plurality of storage devices, so as to reroute at least part of workload of the first HBA port to another HBA port of the plurality of HBA ports. As can be understood by those skilled in the art, the first HBA port may be any HBA port in a plurality of different HBA ports. For example, when it is detected that the load via HBA 1 (111) in FIG. 1 is so high that the HBA 1 becomes a bottleneck of the whole storage system, some storage devices via the HBA port may be rerouted to HBA 2 port (112), namely, for these storage devices, a path through HBA2 may be selected as an active path.

Figure 2B:
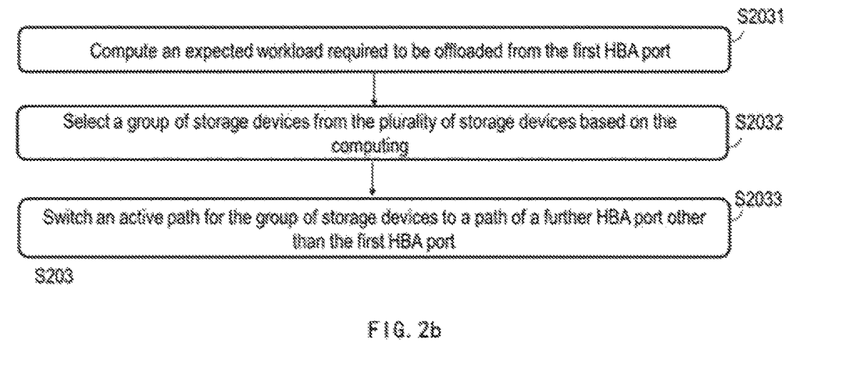

The embodiments of the present disclosure are not limited to re-routing the storage devices in any specific manner at block S203. Hereinafter, one embodiment is provided only as an example. As shown in FIG. 2b, if a performance bottleneck or a too heavy workload is detected at the first HBA port (e.g., HBA 1, 111 in FIG. 1), an expected workload required to be offloaded from the first HBA port may be computed first at S2031; then, at S2032, a group of storage devices are selected from the plurality of storage devices based on the computing, and at S2033, the active paths for the selected group of storage devices are switched to a path u1 through a further HBA (e.g., HBA 2, 112) other than the first HBA port.

In one embodiment, at S2031, the expected workload required to be offloaded may be computed at least based on the performance metric of the first HBA port and a predetermined threshold. For example, current statistical result of the performance metrics of the first HBA port may be compared with the predetermined threshold to obtain an amount exceeding the predetermined threshold (i.e., a difference with the predetermined threshold) as an expected workload required to be offloaded. In another embodiment, an amount larger the difference may be used as the expected workload required to be offloaded.

In one embodiment, a bandwidth of a HBA port may be regarded as a limit of the system resource. Therefore, the threshold may be set as a value approaching the bandwidth of the HBA port. If the throughput of the HBA port is already approaching the bandwidth of the HBA port, a bottleneck of the entire system will be caused. In this regard, the workload expected to be offloaded indicates how much workload should be re-routed from a busy HBA port (e.g., HBA 1) to an idle HBA port (e.g., HBA 2). The expected workload is closely related to the performance statistics and the threshold, or closely related to the HBA port bandwidth, performance statistics, and the threshold. For example, the expected workload computed at block S2031 may be described through the following function:

$$E = f(\text{bandwidth}, \text{threshold}, \text{performance}) \quad (1)$$

Although this example only focuses on bandwidth and a value (E) of the workload expected to be offloaded is obtained, the equation may also be extended to other performance metrics as needed, e.g., IO per second (IOPS), time delay, etc.

In one embodiment, based on the computation at S2031, at S2032, a group of storage devices may be selected from the plurality of storage devices, such that a sum of current performance metrics of the group of storage devices matches the expected workload as computed. For example, selection of the subset may be performed by adopting, for example, but not limited to, the following algorithm: estimating, by leveraging current performance statistics of a storage device (e.g., disk driver), its throughput in near future, and causing the total throughput in the subset of storage devices to be substantially consistent with the expected workload required to be offloaded as computed at S2031. In other words, by routing the group of storage devices to other HBA port, the workload expected to be offloaded can be offloaded. As can be understood by those skilled in the art, the performance metrics of the storage devices used in the operations above are not limited to the throughput, but may also be, for example, occupied bandwidth, data volume, etc.

In another embodiment, at S2032, a plurality of groups of storage devices may be selected from a plurality of storage devices, such that a sum of current performance metrics of each group of storage devices in the plurality of groups of storage devices matches the expected workload as computed; and a group of storage devices are selected from the plurality of groups of storage devices based on a predetermined criterion. In a further embodiment, selecting a group of storage devices from the plurality of groups of storage devices based on a predetermined criterion may include: selecting a group of storage devices with a maximum sum of priority weights from the plurality of groups of storage devices.

In one example, a priority weight for each of the storage devices may indicate a configured priority level. Correspondingly, such selection may be defined as a typical 0-1 knapsack algorithm problem. Formally, this selected can be described by:

$$\text{maximize} \sum_{j=1}^{drives\_num} w_j \times x_j$$

$$\text{subject to} \sum_{j=1}^{drives\_num} p_j \times x_j \approx E \text{ and } x \in \{0, 1\}$$

where, $p_j$ indicates current performance statistics of a storage device; $w_j$ indicates a priority weight of a storage device, which may be a user-configured weight (e.g., number of hops from a disk to HBA), or a dynamic weight obtained through other statistics operation; $x_j$ indicates a 0-1 variable, which determines whether a driver j belongs to the subset. For example, the value 1 indicates belonging to the subset, while the value 0 indicates not belonging to the subset.

As can be understood by those skilled in the art, selecting a group of storage devices from a plurality of groups of storage devices may also be performed based on other predetermined criteria, for example, selecting a group with a least number of storage devices, or a group with the worst average performance, etc. Therefore, embodiments of the present disclosure are not limited to selecting based on any specific criteria.

In one embodiment, the method 200 may further comprise: at block S204, monitoring topology update of the storage system; and the block S203 may include: selecting an active path for a storage device in the plurality of storage devices according to a first path selection policy in response to detecting a topology update event without detecting a performance related event; and selecting an active path for a storage device in the plurality of storage devices according to a second path selection policy in response to detecting a performance related event.

With this embodiment, the topology change and performance statistics can be monitored; and corresponding processing can be performed dependent on different events. In one embodiment, the first path selection policy may be a default static path selection policy, and/or, the second path selection policy is a dynamic path selection policy. For example, for a topology update event, a hops-based path selection method may be employed, or a static mapper path selection method for SSD chains based on experimental results may be introduced for some specific platforms, while for a performance-related event, a dynamic path selector may be used.

In a further embodiment, if a topology update event is monitored but a performance related event is not detected, validity of an updated topology may be verified at S204, and if the updated topology is valid, an active path for a storage device of the plurality of storage devices may be selected at block S203 according to a first path selection policy.

In one embodiment, a path may have a priority, and at block S203, an active path for a storage device in a plurality of storage devices may be selected from plurality of paths based on a result of detecting, a dynamic performance statistics, and a priority of the path.

The path priority may be pre-configured or dynamically updated. For example, in one embodiment, the method 200 may further include: at block S205, updating a status of the path and/or a priority of the path based on a result of selecting at block S203. A result of the updating may be used for subsequent path selection.

In another embodiment, monitoring, detecting and selecting at blocks S201-S203 may be performed iteratively, till reaching the desired performance objective. For example, after performing an active path selection at S203, monitoring of performance metrics kicks off in block S201, and the result of selecting is tuned at S203. For example, if the result of monitoring at S201 shows that the desired performance objective has been reached (e.g., the throughput routed to the busy HBA has been lower than a threshold), the path selection process may be terminated; otherwise, the monitoring and the tuning may continue.

Hereinafter, a structure of an apparatus 300 for path selection in a storage system will be described with reference to FIG. 3. The storage system to which the apparatus 300 is applied includes a plurality of storage devices (e.g., 121-128 in FIG. 1), each storage device being connected to a plurality of different ports (e.g., HBA ports 111 and 112 in FIG. 1) of a server (e.g., 110 in FIG. 1). For example, the storage system may be (but not limited to) as shown in FIG. 1. The apparatus 300 may perform the method 200 depicted with reference to FIG. 2, but not limited to performing the method 200. Likewise, the method 200 may be performed by the apparatus 300, but not limited to being performed by the apparatus 300. For example, some operations of the method 200 may be performed by other apparatus.

In one embodiment, the apparatus 300 comprises: a performance monitor 301 configured to monitor a system-wide performance metric of the storage system to obtain dynamic performance statistics; an event detector 302 configured to detect a performance-related event based on the dynamic performance statistics; and a path selector 303 configured to select, from the plurality of paths, an active path for a storage device of the plurality of storage devices based on the dynamic performance statistics and a result of the detecting.

In one embodiment, units 301-303 may be configured to perform steps S201-S203 of the method 200 described with reference to FIG. 2. Therefore, relevant depictions regarding the method 200 are also applicable here.

In one embodiment, the performance monitor 301 may include: a port performance monitor 3011 configured to monitor a system-wide performance metric of the storage system by monitoring performance metrics at the plurality of different HBA ports. In an example embodiment, the performance metrics at the plurality of different HBA ports may include, but not limited to at least one of: throughput, delay, and resource utilization.

In a further embodiment, the performance monitor 301 may further include a local performance monitor 3012 configured to monitor a local performance metric of the plurality of storage devices, and/or a local performance metric of a plurality of paths.

In one embodiment, the performance-related event detected by the event detector 302 may include at least one of the following: performance bottleneck at an HBA port in a plurality of different HBA ports; imbalance of performance of the plurality of HBA ports, and/or the performance of a storage device of the plurality of storage devices being lower than a threshold.

The path selector 303 may perform path selection for a storage device in various manners at least based on a system-wide dynamic performance statics. Only as an example, the path selector 303 may divide the plurality of storage devices into a plurality of subsets corresponding to the plurality of different HBA ports based on a result of detecting and dynamic performance statistics, and route storage devices of each subset to corresponding HBA ports.

Alternatively or additionally, the path selector 303 may include: a load balancer 3031 configured to re-route at least part of workload of a first HBA port to another HBA port of the plurality of HBA ports if a performance bottleneck or a too heavy workload at the first HBA port of the plurality of different HBA ports is detected.

In another embodiment, the load balancer 3031 may further include: an offloaded workload computing device 30311 configured to compute an expected workload required to be offloaded from the first HBA port if a performance bottleneck at or a too heavy workload at the first HBA port of the plurality of different HBA ports is detected; a storage device selector 30312 configured to select a group of storage devices from the plurality of storage devices based on the computing, and a path switching device 30313 configured to switch the active path for the group of storage devices to a path through another HBA port other than the first HBA port.

In a further embodiment, the offloaded workload computing device 30311 may be further configured to: compute the expected workload required to be offloaded at least based on a performance metric of the first HBA port and a predetermined threshold. For example, the expected workload is obtained by comparing the performance metric of the first HBA port with a predetermined threshold.

In a further embodiment, the storage device selector 30312 may be further configured to: select a group of storage devices from the plurality of storage devices, such that a sum of current performance metrics of the group of storage devices matches the computed expected workload. In one embodiment, the storage device selector may be further configured to: select a plurality of groups of storage devices from the plurality of storage devices, such that a sum of the current performance metrics of each group of storage devices in the plurality of groups of storage devices matches the expected workload as computed; and select a group of storage devices from the plurality of groups of storage devices based on a predetermined criterion. As can be understood by those skilled in the art, embodiments of the present disclosure are not limited to selecting a group of storage devices from a plurality of groups of storage devices according to any specific predetermined criterion. Only as an example, the criterion may include: selecting a group of storage devices with a maximum sum of priority weights from among the plurality of groups of storage devices. In other embodiments, selection may also be performed based on the number of storage devices in each group, average performance of storage devices in each group, etc.

In one embodiment, alternatively or additionally, the apparatus 300 may include: a topology monitor 304 configured to monitor topology update of the storage system; and the path selector 303 may further include a decision module 3032 configured to select an active path for a storage device of the plurality of storage devices according to a first path selection policy in response to detecting a topology update event without detecting a performance related event; and to select an active path for a storage device of the plurality of storage devices according to a second path selection policy in response to detecting a performance related event. In another embodiment, the first path selection policy may be a default static path selection policy, and/or, the second path selection policy may be a dynamic path selection policy.

In a further embodiment, the apparatus may also comprise a topology verifier 305 configured to verify validity of an updated topology in response to detecting a topology update event, and the decision module 3032 may also be configured to select an active path for a storage device of the plurality of storage devices according to a first path selection policy in response to detecting that the updated topology is valid but the performance related event is not detected.

In one embodiment, the path selector 303 may be further configured to: select, from the plurality of paths, an active path for a storage device of the plurality of storage devices based on other parameters than a result of detecting and the dynamic performance statistics, for example, a priority of a path.

In another embodiment, the apparatus 300 may further comprise a multipath module 306 configured to update a path status and/or a path priority based on a result of selecting by the path selector 303.

In one embodiment, the apparatus 300 may further comprise a performance tuner 307 configured to cause the performance monitor 301, the event detector 302, and the path selector 303 to perform the monitoring, detecting, and selecting operations iteratively, till reaching a desired performance objective.

Figure 3:
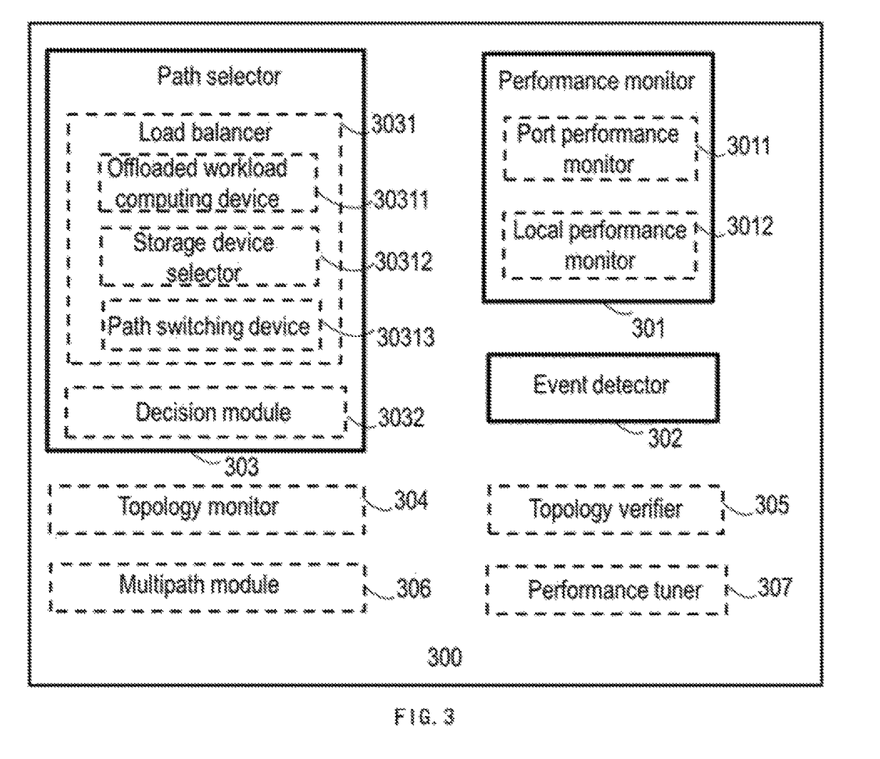
FIG. 3 shows an example structural diagram of an apparatus according to an embodiment of the present disclosure.

As can be understood by those skilled in the art, the apparatus 300 may also include other units not shown in FIG. 3; and in some embodiments, some units in FIG. 3 may be omitted. And, in some embodiments, an operation performed by one unit in FIG. 3 may also be performed in a distributed way in multiple units; similarly, in some other embodiments, the operations performed by a plurality of units in FIG. 3 may also be implemented by a single component.

Figure 4:
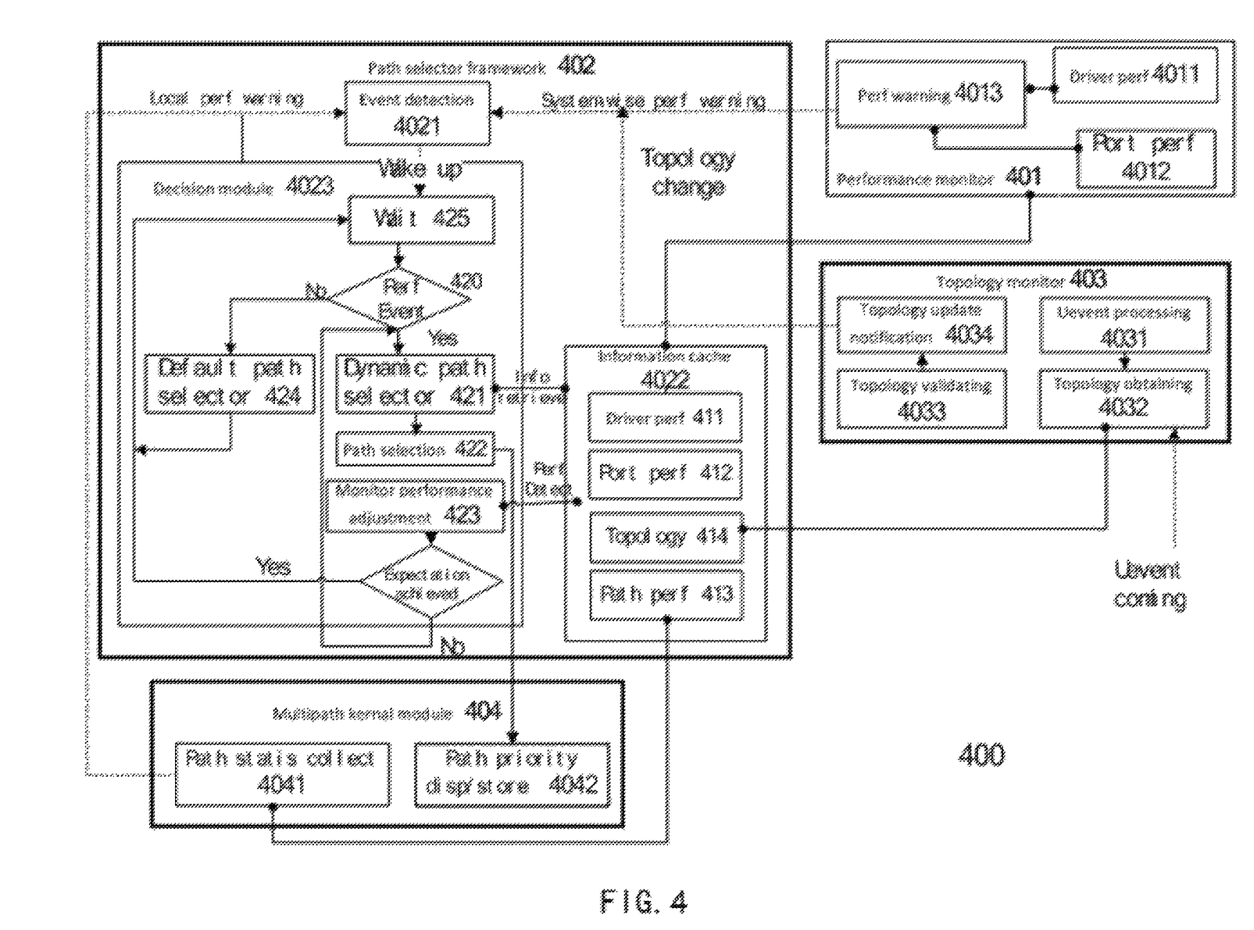
FIG. 4 shows a schematic operating diagram of another apparatus according to an embodiment of the present disclosure.

FIG. 4 shows a schematic diagram of iteratively performing path selection according to the embodiments of the present disclosure by another apparatus 400. The apparatus 400 includes a performance monitor 401, a path selector framework 402 (including an adaptive path selector 421), a topology monitor 403, and a multipath kernal module 404. The underlying basic idea is: monitoring performance metrics, not only including local path status, but also including system-wide resource utilization. With these dynamic statistics, a performance bottleneck can be detected timely and notified to a decision module. Then, the decision module (4023) in the path selector framework 402 may further analyze performance metrics, system resource utilization, and system topology. Afterwards, a path selection suggestion will be provided for performing path selection (422) so as to obtain workload balance. The multipath kernal module will finally provide a path selection mechanism to support the above policy.

Functions of various components of the apparatus 400 in FIG. 4 may be summarized as below:

The function of the performance monitor 401 is similar to the performance monitor 301 in FIG. 3, and it collects performance metrics of storage devices (e.g., disk drivers) and ports (e.g., HBA port). The monitoring, for example, may be performed by the driver performance module 4011 and the port performance module 4012 shown in FIG. 4, respectively. When a system-wide bottleneck is detected, the performance warning module 4013 may notify the path selection framework 402 by sending a system-wide performance event.

As shown in FIG. 4, the topological monitor 403 may include 4 sub-components: device hot-plug event (Uevent) processing unit 4031, topology obtaining unit 4032, topology validating unit 4033, and topology update notification unit 4034. The topology monitor 403 may implement functions of the topology monitor 304 and the topology verifier 305 in FIG. 3.

Here, the Uevent processing unit 4031 is configured to focus on Uevent collection and analysis. Uevent indicates an event associated with topology change, e.g., change of the number of disks. When the topology change is stabilized, the Uevent processing unit 4031 may invoke the topology validating unit 4033.

The topology obtaining unit 4032 is configured to maintain topology information for use by other components. For example, the path selector framework 402 may use the information. The topology validating unit 4033 will check whether a topology is valid. Whether the topology is valid is determined by whether the updated topology meets requirements and configuration of a product. For example, if an invalid topology exists, it may be considered as meaningless to perform path selection. The topology update notifying unit 4034 is configured to awaken the path selection framework 402 by sending a topology change event.

The multipath kernal module 404 can detect path status and statistics (4041), e.g., perform at least part of functions in the local performance monitor 3012 in FIG. 3. When it detects a local bottleneck on a path, it will notify the path selection framework 402 by sending a local performance event. It may also provide a display/storage sysfs interface (4042) to enable the path selection framework 402 to change a path priority.

In this example, the path selection framework 402 mainly includes three functional parts: an event detection 4021, an information cache 4022, and a decision module 4023. Specific functions of respective parts are provided below, and the functions of respective parts may also be implemented by sub-modules:

Event detection 4021 is configured to receive events and classify them (420). It might receive a plurality of types of events and only schedule performance-related events to the dynamic path selector in the decision module 4023. The topology event indicates a topology change, which may be processed by a configured static path selector (424).

Information cache 4022 is configured to maintain information related to performance and topology. Different information may be maintained by different sub-modules, respectively, as shown in FIG. 4. For example, the driver performance module 411 maintains information related to the driver performance; the port performance module 412 maintains information related to the HBA port performance; the path performance module 413 maintains information related to path performance; and the topology module 414 maintains information related to topology. The core decision module 4023 can access them by invoking an information cache interface.

The decision module 4023 may be configured to perform at least part of functions of the decision module 3032 in FIG. 3. For example, the event detector 4021 unit awakens the decision module 4023, and then the core decision logic starts. The decision module 4023 may include a dynamic path selector 421 that plays a core role in the adaptive path selection algorithm. It may implement the function block S203 described above with reference to FIG. 2 or implement all or part of functions of the path selection unit 303 described above with reference to FIG. 3.

In addition, as shown in FIG. 4, various parts of the apparatus 400 may communicate to update the statistics based on a result of path selection, and the monitor performance adjustment (423) cause the event detection and path selection operation to be performed iteratively till a desired performance objective is achieved. After the expectation is achieved, a standby state (425) may be entered.

As can be understood by those skilled in the art, what is shown in FIG. 3 or FIG. 4 is only an example structure. Embodiments of the present disclosure may also implement dynamic path selection based on system-wide performance with other structure different from what is shown in FIG. 3 or FIG. 4. For example, apparatuses 300, 400 may also include other units not shown in FIGS. 3-4; and in some embodiments, some units in FIGS. 3-4 may be omitted. Moreover, in some embodiments, operations performed by one unit in FIGS. 3-4 may also be performed in a distributed way in a plurality of units; similarly, in some other embodiments, operations performed by a plurality of units in FIGS. 3-4 may also be implemented by a single component.

In embodiments of the present disclosure, an intelligent path selection solution is designed for a load balance issue at the multipath side. It may be implemented, for example, by the path selection framework in FIG. 4 and the dynamic path selector therein. This framework detects topology update and performance bottleneck, thereby notifying the path selector to perform path selection for load balance. The dynamic path selector may perform path selection by utilizing topology knowledge, and/or local performance statistics, and/or system-wide performance statistics. The solution may also be configured to iteratively monitor performance and path selection so as to obtain performance adjustment adaptively. Various components work together to provide a scheme more intelligent and flexible than the prior art.

Although in some embodiments, the method and apparatus provided in the present disclosure may be applied at the SAS domain. However, the embodiments of the present disclosure are not limited thereto; instead, they can be applied to other domains, e.g., FC, ISCSI storage domain, etc.

Those skilled in the art will be easily appreciated that blocks or steps in various methods above may be performed through a programming computer. In the present disclosure, some embodiments also intend to cover a program storage system, e.g., digital data storage medium, which includes an instruction program that is machine or computer-readable and executable by an encoding machine or a computer, wherein the instruction executes some or all of the steps of the above method. The program storage system may be, for example, a digital memory, a magnetic storage medium such as a disk or tape, a hard disk driver or an optical readable digital data storage medium. The embodiment also intends to cover a computer programmed to execute the steps of the method above. Some embodiments also intend to cover a device that comprises at least one processor; and at least one memory including computer program code, wherein the at least one memory and the computer program code are configured to, with the at least one processor, cause the apparatus to perform the method 200.

Functions of various elements of the apparatus shown in the drawings may be provided by software, dedicated hardware, and hardware associated with appropriate software and capable of executing software, or firmware, or a combination thereof. When the functions are provided by a processor, the functions may be provided by a single dedicated processor, a single shared processor, or a plurality of separate processors. Besides, the term "processor" may include, but not limited to, a digital signal processor (DSP) hardware, a network processor, an application-specific integrated circuit (ASIC), a field programmable gate array (FPGA), a read-only memory (ROM), a random access memory (RAM) and a non-volatile memory device for storing software. There may also comprise other conventional and/or customized hardware.

Those skilled in the art should understand, the description and drawings are only for illustrating the principle of the embodiments of the present disclosure. Therefore, it should be understood that those skilled in the art can design various arrangements which, though not explicitly described or illustrated here, embody the principle of the embodiments of the present disclosure and are covered within the spirit and scope of the embodiments of the present disclosure. Besides, all examples illustrated here are mainly intended expressly for teaching purposes so as to help readers to understand the principle of the embodiments of the present disclosure and the concept contributed by the inventor to further the art, and should be construed as not limited to these specifically expounded examples and conditions. Moreover, the principle and aspects of the embodiments of the present disclosure as expounded here and all explanations of the embodiments and their specific examples are also intended to include their equivalents.

We claim:

1. A method for a storage system, the storage system including a plurality of storage devices, each of the plurality of storage devices being connected to a plurality of different host bus adapter (HBA) ports of a server via a plurality of paths, the method comprising:
   monitoring a system-wide performance metric of the storage system to obtain dynamic performance statistics, wherein the system wide performance metric includes at least one of delay and resource utilization of the plurality of different HBA ports;
   detecting a performance related event based on the dynamic performance statistics; and
   selecting, from the plurality of paths, an active path for a storage device of the plurality of storage devices based on the dynamic performance statistics and a result of the detecting, wherein selecting an active path for the storage device of the plurality of storage devices includes:
      dividing, based on the dynamic performance statistics and the result of the detecting, the plurality of storage devices into a plurality of subsets respectively corresponding to the plurality of different HBA ports; and
      routing storage devices in each of the plurality of subsets to their corresponding HBA ports.

2. The method of claim 1, wherein monitoring a system-wide performance metric of the storage system comprises:
   monitoring a performance metric of the plurality of different HBA ports.

3. The method of claim 2, wherein the performance metric of the plurality of different HBA ports includes throughput.

4. The method of claim 2, wherein monitoring a system-wide performance metric of the storage system further comprises monitoring at least one of:
   local performance metrics of the plurality of storage devices, and
   local performance metrics of the plurality of paths.

5. The method of claim 1, wherein the performance related event includes at least one of:
   a performance bottleneck at a HBA port of the plurality of different HBA ports,
   imbalance of performance of the plurality of HBA ports, and
   performance of a storage device of the plurality of storage devices being lower than a threshold.

6. The method of claim 1, wherein selecting, from the plurality of paths, an active path for a storage device of the plurality of storage devices based on the dynamic performance statistics and a result of the detecting comprises:
   in response to detecting a performance bottleneck or a heavy workload at a first HBA port of the plurality of different HBA ports, performing dynamic path selection for a storage device of the plurality of storage devices so as to re-route at least part of a workload of the first HBA port to a further HBA port of the plurality of HBA ports.

7. The method of claim 6, wherein performing dynamic path selection for a storage device of the plurality of storage devices so as to re-route at least part of a workload of the first HBA port to a further HBA port of the plurality of HBA ports comprises:
   computing an expected workload required to be offloaded from the first HBA port;
   selecting a group of storage devices from the plurality of storage devices based on the computing; and
   switching an active path for the group of storage devices to a path of a further HBA port other than the first HBA port.

8. The method of claim 7, wherein computing an expected workload required to be offloaded from the first HBA port comprises:
   computing the expected workload required to be offloaded at least based on a performance metric of the first HBA port and a predetermined threshold.

9. The method of claim 7, wherein selecting a group of storage devices from the plurality of storage devices based on the computing comprises:

selecting a group of storage devices from the plurality of storage devices, such that a sum of current performance metrics of the group of storage devices matches the computed expected workload.

10. The method of claim 7, wherein selecting a group of storage devices from the plurality of storage devices based on the computing comprises:
   selecting a plurality of groups of storage devices from the plurality of storage devices, such that a sum of current performance metrics of each of the plurality of groups of storage devices matches the computed expected workload; and
   selecting a group of storage devices from the plurality of groups of storage devices based on a predetermined criterion.

11. The method of claim 10, wherein selecting a group of storage devices from the plurality of groups of storage devices based on a predetermined criterion comprises:
   selecting, from the plurality of groups of storage devices, a group of storage devices with a maximum sum of priority weights.

12. An apparatus for a storage system, the storage system including a plurality of storage devices, each of the plurality of storage devices being connected to a plurality of different host bus adapter (HBA) ports of a server via a plurality of paths, the apparatus comprising:
   a performance monitor configured to monitor a system-wide performance metric of the storage system to obtain dynamic performance statistics, wherein the system wide performance metric includes at least one of delay and resource utilization of the plurality of different HBA ports;
   an event detector configured to detect a performance-related event based on the dynamic performance statistics; and
   a path selector configured to select, from the plurality of paths, an active path for a storage device of the plurality of storage devices based on the dynamic performance statistics and a result of the detecting, wherein the path selector is configured to select, from the plurality of paths, an active path for a storage device of the plurality of storage devices by:
      dividing, based on the dynamic performance statistics and the result of the detecting, the plurality of storage devices into a plurality of subsets respectively corresponding to the plurality of different HBA ports; and
      routing storage devices of each of the plurality of subsets to their corresponding HBA port.

13. The apparatus of claim 12, wherein the performance monitor comprises:
   an HBA port performance monitor configured to monitor a system-wide performance metric of the storage system by monitoring a performance metric of the plurality of different HBA ports.

14. The apparatus of claim 13, wherein the performance metric of the plurality of different HBA ports include throughput.

15. The apparatus of claim 13, wherein the performance monitor further includes a local performance monitor configured to monitor at least one of:
   local performance metrics of the plurality of storage devices, and
   local performance metrics of the plurality of paths.

16. The apparatus of claim 12, wherein the performance related event includes at least one of:
   a performance bottleneck at a HBA port of the plurality of different HBA ports,
   imbalance of performance of the plurality of HBA ports, and
   performance of a storage device of the plurality of storage devices being lower than a threshold.

17. The apparatus of claim 12, wherein the path selector further comprises:
   a load balancer configured to, in response to detecting a performance bottleneck or a heavy workload at a first HBA port of the plurality of different HBA ports, re-route at least part of a workload of the first HBA port to a further HBA port of the plurality of HBA ports.

18. The apparatus of claim 17, wherein the load balancer comprises:
   an offloaded workload computing device configured to, in response to detecting a performance bottleneck or a heavy workload at the first HBA port of the plurality of different HBA ports, compute an expected workload required to be offloaded from the first HBA port;
   a storage device selector configured to select a group of storage devices from the plurality of storage devices based on the computing; and
   a path switching device configured to switch an active path for the group of storage devices to a path of a further HBA port other than the first HBA port.

* * * * *